INVENTOR
FRANK T. GOSTOMSKI
BY
TW Secrest
ATTORNEY

# United States Patent Office 3,447,826
Patented June 3, 1969

3,447,826
LATERALLY EXTENSIBLE BUMPER ASSEMBLY
Frank T. Gostomski, 246 W. 8th St.,
Wahoo, Nebr. 68066
Filed Nov. 21, 1967, Ser. No. 684,673
Int. Cl. B60r 19/02, 19/04
U.S. Cl. 293—69                                5 Claims

ABSTRACT OF THE DISCLOSURE

This invention relates to a bumper assembly for vehicles, as a pick-up truck, carrying a fixed load, as a camper, and which bumper assembly is extensible and contractable in length to provide bumper protection for the vehicle alone or for the vehicle and the fixed load together. The invention further relates to the construction of such bumper assembly, as a tubular hollow bumper having a longitudinally extending passageway therein in which is slidably mounted bumper tips and which tips are securely held at selected extensions to the bumper.

---

My invention relates to a bumper assembly and more particularly to one which is extensible and contractable in length dimension and which length dimension extends transversely of the vehicle.

Many vehicles, as pick-up trucks, are loaded with a fixed load, as a camper, and the fixed load is wider than the width of the vehicle. This provides a problem in that the vehicle may be provided with the bumper protection built with the vehicle but the fixed load does not have bumper protection in accordance with prior art practices.

When vehicles with campers mounted thereon are parked, and particularly about trailer parks, experience has demonstrated the need of bumper protection for the camper as well as the vehicle. Also, there is the need of bumper protection for such campers while the vehicle is driven on highways.

It is an object of my invention to provide a bumper assembly for a vehicle, which is expandable in length or retractable from such extended length, so that the bumper assembly length can be adjusted to provide for bumper protection for the vehicle and its fixed load, or for merely the vehicle.

A further object is to provide a bumper of a box beam construction providing a hollow bumper, rectangular in section, and which has a passageway extending in a direction transversely of the vehicle.

A further object is to slidably mount bumper tips in the side end portions of said passageway and to detachably secure the bumper strips to the bumper in adjusted extension positions thereof.

A further object is to provide holes in said bumper and said bumper tips and bolt and nut means cooperating therewith providing for adjusted extension of the bumper tips relative to the bumper or for removal of the bumper tips.

The foregoing general objects of my invention, together with others inherent in the same, will become apparent or implicit as the detailed consideration of the drawings proceeds, wherein.

Figure 1:
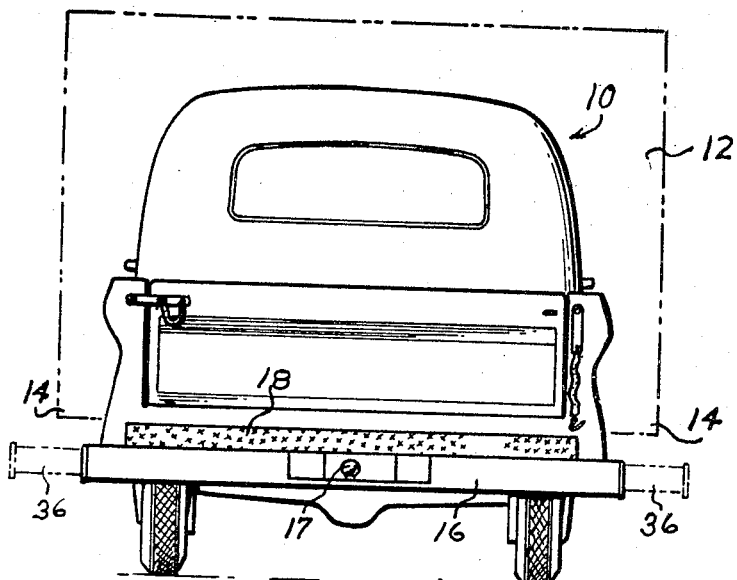
FIGURE 1 is a rear elevational view of a vehicle, equipped with my invention, and showing in phantom a camper attached to the vehicle and showing by dot lines an extension of the bumper tips relative to the bumper.

Referring now to the drawing, wherein like reference numerals indicate like parts, a vehicle 10, of the type commonly called a pick-up truck, is shown. A camper 12 is shown in phantom. Often campers have the maximum width, allowable by law for vehicles regularly traveling on our highways, to obtain the maximum utility of the camper. Thus, there may be a difference by a number of feet in the widths of the vehicle 10 and the camper 12. In view of such difference in the widths, the lateral outer side edge portions 14 of the camper 12 are not afforded protection by bumpers of normal width originally fabricated with the vehicle 10 and designed to protect the same. However, such campers 12 need bumper protection when parked, and also, preferably, when traveling on highways. Also, if the bumpers are wide enough to protect the camper 12 and such edges 14 thereof and further if no camper 12 is present on the vehicle 10, then such wider bumpers become a definite hazard as they project laterally from the vehicle 10 to unexpected extensions. Certainly, others (as other drivers and pedestrians) would not realize in time to avoid accidental results, that the bumpers of a vehicle were extra width and of a width much wider than the width of the vehicle. Not only would such extra width not be expected by others, but with the lack of background contrasts, it would not be normally noticed. The visual phenomenon resulting would certainly have features in common with that of a long trailing and overhanging load of such objects as pipes and rods from the trailing end of a truck without predominant flags and the like to indicate the length of the unexpected overhanging load.

Figure 2:
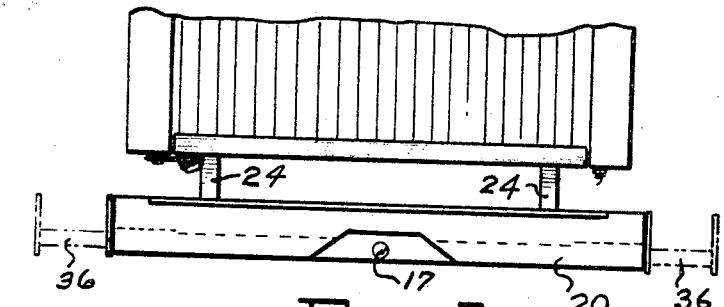
FIG. 2 is a rear elevational view, showing a modified form of bumper attached to a fragment of a vehicle.

A bumper 16 may have a towing hitch 17, for obvious purposes, and further may have the vertical riser plate 18 of FIG. 1. Such vertical riser plate 18 is optional and is not used with the bumper 20 of FIG. 2. Vertical riser plates are often employed to protect vehicles against other vehicles having higher than average bumpers. Also, if a plate 18 is employed, the same may be connected to the bumper 16 by horizontal plate 22. In the construction of FIG. 1 (see also FIGS. 3 and 4), the riser plate 18 may be welded to the horizontal plate 22 and the plate 22 and the box bumper 20 may be formed of a single plate, properly configured, and with the joining seam welded.

Figure 4:
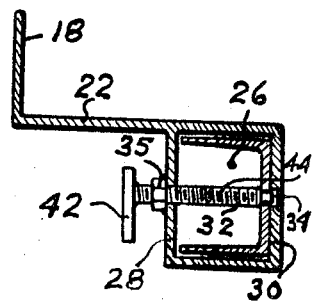
FIG. 4 is a sectional view, on a larger scale, taken substantially on broken line 4—4 of FIG. 3.
Figure 3:
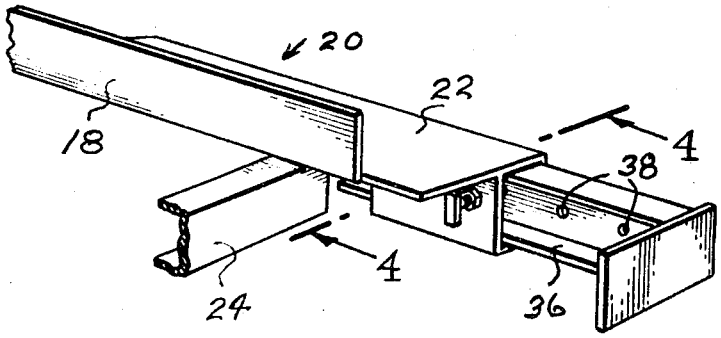
FIG. 3 is a perspective view, on a larger scale, showing a fragment of a bumper supporting bracket and a fragment of a bumper of the style of FIG. 1 secured thereto.

Referring now more specifically to FIGS. 3 and 4, bumper 16 is generally a box beam and comprises a transverse passageway 26, forward wall 28 and a rearwall 30. The forward wall 28 has spaced apart holes 32 therein and preferably has recesses or detents 34 in the forward surface of its rear wall 30 and which holes and recesses are alined in paired relation laterally considered in respect to the vehicle 10. A threaded nut 35 is secured to the wall 28, as by welding the same to the forward surface of said wall 28. Bumper tip members 36 are provided to make the overall length, of the bumper 16 and bumper tips 36, extensible and contractable. A bumper tip member 36 is slidably mounted in each side end portion of the transverse passageway 26. Each bumper tip member 36 is provided with a plurality of spaced apart holes 38 therein (see FIG. 3), the number of such holes and the spacing therebetween in different tip members being mated so that a similar extension or contraction projects from opposite end portions of the bumper 16. By having the bumper tips 36 of suitable length, and by having sufficient number of spaced apart holes 38 therein, any suitable extension or contraction of the overall length of the bumper 16 and bumper tips 36 may be readily obtained.

Figure 5:
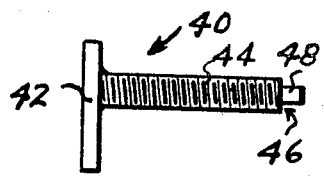
FIG. 5 is an elevational view, on a larger scale than FIG. 4, of bolt means shown in FIG. 4.

A bolt means 40 (FIG. 5) has a head portion which is preferably in the form of a lever or rod 42 so the same may be readily turned by hand without need, necessarily, of a wrench to turn the same. The bolt means 40 also has a shank portion 44, a shoulder portion 46, and terminates in an undercut tip portion 48. The bolt means 40 is turned, with the threads of shank 44 engaging the threads of nut 35, to insert the same in place. The bolt passes through nut 35 and through the hole 32 in the wall 28 of bumper 16. The undercut tip portion 48 passes through a hole 38 in the bumper tip 36 and into the recess or detent 34 in the front face of the rear wall 30 of the bumper 16. The shoulder 46 may be urged firmly against the bumper tip 36 and thus holds the bumper tip 36 firmly against the bumper 16. Also, if desired, a lock nut (not shown) may be employed and the same urged firmly against the nut 35 and this will lock the bolt means 40 against turning and loosening.

In view of the foregoing detailed description, it will now be apparent that I have provided a bumper assembly which is adapted to be connected to and supported by the chassis of a vehicle, such as a pick-up truck 10. The said assembly comprises spaced brackets 24 which extend longitudinally of the vehicle 10. Next brackets 24 are connected with and support transversely extending tubular hollow bumpers 16 or 20 and which bumpers may be rectangular in section, have forward walls 28 and rear walls 30 and have a transversely extending passageway 26. The bumper 16 has recesses 34 in the forward surface of its rear wall 30 and has holes 32 in the forward walls 28. The said holes 32 and recesses 34 are alined transversely of the bumpers 16 in paired relation or in registration. A bumper tip 36 is slidably mounted in each side end portion of said transverse passageway 26 and each bumper tip 36 has a plurality of spaced holes 38 therein. These holes 38 in the bumper tips 36 are provided in matched patterns so that the amount of extension resulting from bumper tips 36 may be the same on both sides of the vehicle 10. The means to detachably secure the bumper tips 36 to the bumpers 16 is preferably in the nature of the bolt and nut means best shown in FIGS. 4 and 5. Here the bolt means 40 has an operating lever 42 (for ready hand operation), threaded shank 44, a shoulder 46, and an undercut tip portion 48, and, if desired, a lock nut (not shown) may be used for obvious purposes. Such bolt means 40 firmly urges a bumper tip 36 against a wall of the bumper 16 and thus prevents relative movement between the same. Preferably the brackets 24 are U-shaped in section and have their bases vertically disposed providing for maximum strength against side thrust against them and providing ready means for securing the brackets to the chassis of a vehicle 10.

Obviously, changes may be made in the forms, dimensions, and arrangements of the parts of my invention without departing from the principle thereof, the above setting forth only preferred forms of embodiment of my invention.

I claim:
1. A bumper assembly adapted to be connected to, and supported by, the chassis of a vehicle comprising laterally spaced apart vehicular attachable, and longitudinally extending brackets; a transversely extending hollow bumper connected with, and supported by, said brackets, said bumper having spaced apart holes therein and having a transverse passageway therein; an extensible and contractable bumper tip member slidably mounted in each side end portion of said transverse passageway, each bumper tip member having a plurality of spaced apart holes, a selected one of which is alinable with a hole in said bumper; and bolt means disposed in said holes in said bumper and said bumper tip members securing the same together.

2. The combination of claim 1 wherein said brackets are channels, U-shaped in section, and the bases of said U-shapes are vertically disposed.

3. A bumper assembly adapted to be connected to, and supported by, the chassis of a vehicle comprising laterally spaced apart vehicular attachable, and longitudinally extending brackets; a transversely extending hollow bumper connected with, and supported by, said brackets, said bumper being rectangular in section, having forward and rear walls, and providing a rectangular transverse passageway and said bumper further having laterally spaced recesses in the forward surface of its rear wall, holes in its forward wall alined therewith, and a threaded nut means registering with each said hole and secured to said forward wall; an extensible and contractable bumper tip member slidably mounted in each side end portion of said transverse passageway, each bumper tip member having a plurality of spaced apart holes, a selected one of which is alinable with a hole and its corresponding recess in the said bumper; and bolt means threadingly positioned in said nut on said bumper, extending through the adjacent hole in the bumper, and extending through a hole in said bumper tip member.

4. The combination of claim 3 wherein said bolt means has a head at one end portion, a threaded shank, a shoulder portion, and an undercut portion at its other end portion, and wherein the undercut end portion extends into a hole in the bumper tip member, and into the registering recess in the bumper and the shoulder portion abuts against the bumper tip member and urges the bumper tip member toward the bumper to prevent movement of the bumper tip relative to the bumper.

5. The combination of claim 4 wherein said head of said bolt means is in the form of a rod eliminating the need of a wrench to loosen or tighten said bolt.

References Cited

UNITED STATES PATENTS

| 1,146,355 | 7/1915 | Shilling | 293—69 |
| 1,326,795 | 12/1919 | Sjolander | 293—69 |
| 1,474,929 | 11/1923 | Fagan | 5—119 |
| 1,530,429 | 3/1925 | Sjolander | 293—69 |

ARTHUR L. LA POINT, *Primary Examiner.*

H. BELTRAN, *Assistant Examiner.*

U.S. Cl. X.R.

280—500; 293—73; 296—26